(12) United States Patent
Corcoran

(10) Patent No.: US 10,023,213 B1
(45) Date of Patent: Jul. 17, 2018

(54) DISC GOLF TRANSPORT SYSTEM

(71) Applicant: Jerry Alvin Corcoran, Canby, OR (US)

(72) Inventor: Jerry Alvin Corcoran, Canby, OR (US)

( * ) Notice: Subject to any disclaimer, the term of this patent is extended or adjusted under 35 U.S.C. 154(b) by 0 days.

(21) Appl. No.: 15/724,784

(22) Filed: Oct. 4, 2017

(51) Int. Cl.
| | |
|---|---|
| *B62B 1/00* | (2006.01) |
| *B62B 3/12* | (2006.01) |
| *B62B 3/04* | (2006.01) |
| *A63B 71/00* | (2006.01) |
| *A63B 67/06* | (2006.01) |
| *A63H 33/18* | (2006.01) |

(52) U.S. Cl.
CPC ............ *B62B 3/12* (2013.01); *A63B 71/0036* (2013.01); *B62B 3/04* (2013.01); *A63B 67/06* (2013.01); *A63B 2225/093* (2013.01); *A63H 33/18* (2013.01); *B62B 2202/404* (2013.01)

(58) Field of Classification Search
CPC ....... B62B 3/04; B62B 3/12; B62B 2202/404; A63B 71/0036; A63B 67/06; A63B 65/10
See application file for complete search history.

(56) References Cited

U.S. PATENT DOCUMENTS

| | | | | |
|---|---|---|---|---|
| 5,029,883 | A * | 7/1991 | Derito | B62B 1/14 280/35 |
| 7,997,595 | B1 * | 8/2011 | Pope | B62B 1/16 280/47.19 |
| 8,746,711 | B1 * | 6/2014 | Jarma | B62B 1/008 280/47.131 |
| 2002/0105156 | A1 * | 8/2002 | Glidden | A63B 71/0036 280/47.19 |
| 2007/0108709 | A1 * | 5/2007 | Wu | B62B 3/04 280/47.34 |
| 2011/0316258 | A1 * | 12/2011 | Lin | B62B 3/02 280/651 |
| 2013/0103245 | A1 * | 4/2013 | Lee | G05D 1/0255 701/23 |
| 2017/0340080 | A1 * | 11/2017 | DeLuz | A45C 13/02 |
| 2018/0008873 | A1 * | 1/2018 | Wang | A63B 55/60 |

* cited by examiner

*Primary Examiner* — Brian L Swenson
(74) *Attorney, Agent, or Firm* — Mark S Hubert

(57) ABSTRACT

A disc golf transport system to allow the movement of disc golf paraphernalia about a course utilizing existing or specialized backpacks. The system uses a three wheeled manual pull cart that has a five point adjustable suspension system incorporating two adjustable, lockable upper arms with peg horns extending therefrom; two pivotable lower arms with length and angle adjustable means for attachment; and a central attachment member. All of the five attachment points allow an attached packpack to be drawn taut from five different points so as to secure, and position the bag in the cart for both easy content access and maximum transit stability.

10 Claims, 14 Drawing Sheets

DISC GOLF TRANSPORT SYSTEM

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to the sport of disc golf, and more particularly to open field transportation systems for golf disc equipment and associated paraphernalia.

BACKGROUND

Disc golf is one of the fastest growing sports in the United States. It attracts a diverse collection of players from all age brackets. Similar to conventional golf there is a plethora of different discs that must accompany the disc golfer for accomplishing different throwing tasks. There is also generally the attendant beverages, food, and clothing that are brought. Although disc golf equipment is smaller than conventional golf equipment, when fully assembled there is a substantial amount of it. Enough such that it must be organized and transported in a personal bag/backpack. The game is played in large open fields or on golf courses and involves traversing over long distances of non-level terrain. For many, this necessitates some way of transporting a heavy, bulky personal bag rather than carrying it themselves.

Henceforth, an improved transport system that eases the burden of transporting disc golf equipment across varying terrains for extended distances would fulfill a long felt need in the disc golf industry. This new invention utilizes and combines known and new technologies in a unique and novel configuration to overcome the aforementioned problems and accomplish this.

BRIEF SUMMARY

In accordance with various embodiments, a system for the transport of disc golf equipment and associated paraphernalia, for lengthy distances across varied terrains is provided.

In one aspect, a manually push cart configured to accept and constrain a specially designed personal backpack in a transportable position that allows easy access to the contents, via a four or five point suspension system is provided.

In another aspect, a multi wheeled, manually pulled rolling cart is provided, capable accepting conventional backpacks for retention in a stable, non-tipping configuration thereon by the width adjustment of the lower retention arms and the width adjustment of the upper retention horns.

In yet another aspect, a golf cart and backpack assembly with a five point retention system is provided capable of allowing adjustment for the cart's stability and for the height the golfer wishes the presentation of the backpack's top opening to be for him.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF CERTAIN EMBODIMENTS

Figure 1:
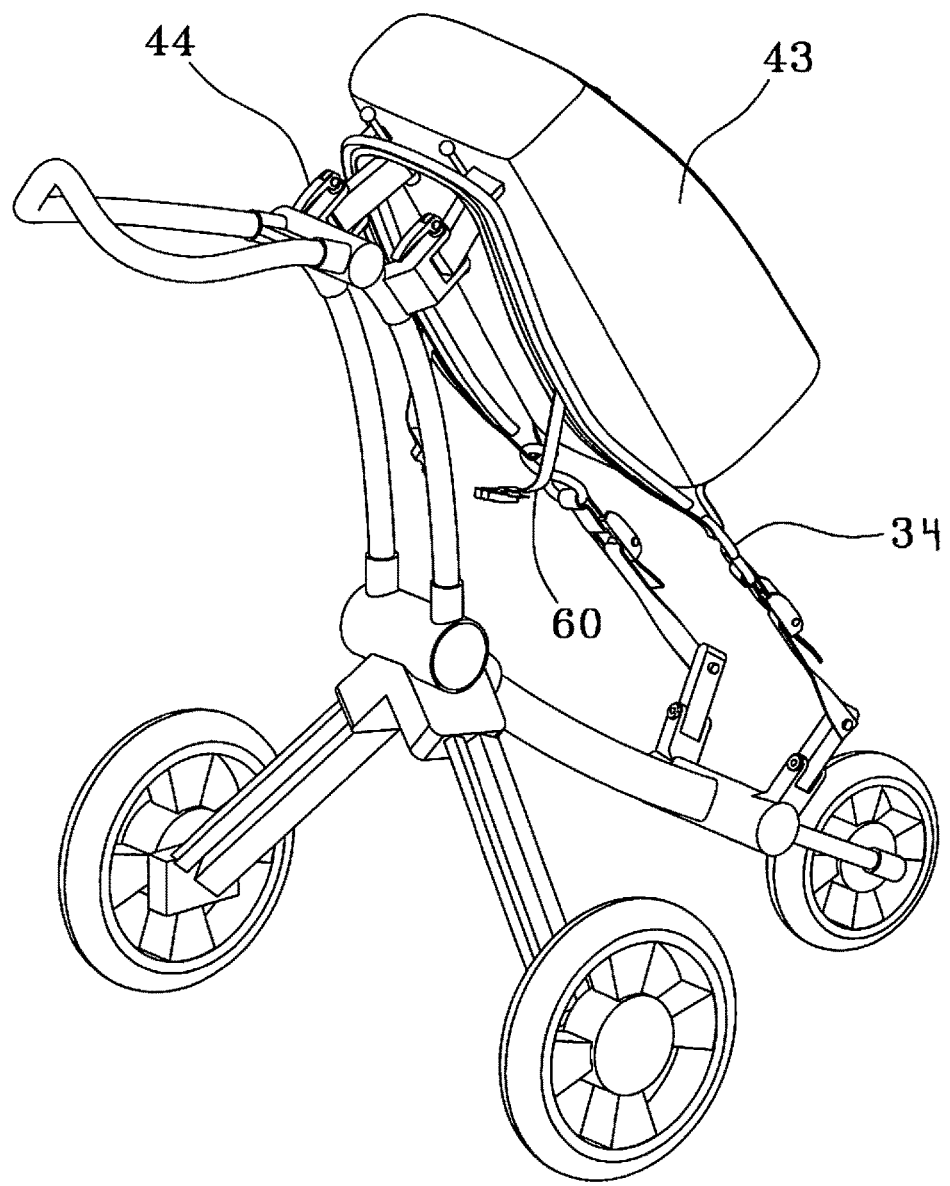
FIG. 1 is a rear perspective view of the disc golf cart and a conventional backpack.

While various aspects and features of certain embodiments have been summarized above, the following detailed description illustrates at least on exemplary embodiment in further detail to enable one skilled in the art to practice such an embodiment. The described example is provided for illustrative purposes and is not intended to limit the scope of the invention.

In the following description, for the purposes of explanation, numerous specific details are set forth in order to provide a thorough understanding of the described embodiment/s. It will be apparent to one skilled in the art, however, that other embodiments of the present invention may be practiced without some of these specific details. While various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The term "adjustable means for attachment" as used herein including the claims, is to be interpreted according to 35 USC § 112 [para] 6. It refers to flexible, length adjustable members including adjustable straps, bungee cords, shock cords, rope, cable, chains, elastic cords, belts and equivalent means of flexible, adjustable connection.

As used herein, the term "hook means" as used herein including the claims, is to be interpreted according to 35 USC § 112 [para] 6. It refers to a mechanical structure able to connect to a ring or an encircled strap by passing at least partially around the side wall of the ring or strap.

The present invention relates to a novel design for a disc golf transport system. The backbone of this system is the disc golf cart which can be coupled with conventional backpacks, disc golf backpacks or the preferred embodiment D ring disc golf backpack designed specifically for use with this disc golf cart 2. This system allows the movement of disc golf paraphernalia about a course utilizing existing or specialized backpacks. The system uses a three wheeled manual pull cart with a five point adjustable suspension system incorporating two adjustable, lockable upper arms with peg horns extending therefrom; two pivotable lower arms with length and angle adjustable means for attachment; and a central attachment member. All of the five attachment points allow an attached packpack to be drawn taut from five different points so as to secure, and position the bag in the cart for both easy content access and maximum transit stability.

Looking at FIGS. 4A, 5, 6, 7A, 8A and 9 the disc golf cart 2 can best be seen and described. The golf disc cart 2 is a three-wheeled cart, having a V shaped central body 3 from which extends downward and forward, a tubular front leg 6. Extending downward and rearward from the central body 3 also are two substantially similar rear legs 8. Mounted transversely at the top of the central body 3 is the handlebar pivot base 4. The pivot base 4 has two upward facing circular sockets 16 that each receive the distal end of an arced support tube 14. (Although in alternate embodiments' there may only be a single support tube and it may or may not be arced.) The proximal ends of the support tubes 14 are affixed in matingly conformed circular lower recesses formed in the bottom side of an upper support bracket 20. A U shaped tubular push handle 23 is matingly engaged into circular upper recesses formed in the top side of the upper support bracket 20 allowing the push handle to extend vertically upward.

Each rear leg 8 is disposed angularly with respect to the front leg 6 and with respect to each other. Each rear leg 8 has a rear wheel assembly 11 rotatably mounted thereon. The front leg 6 has a front fork bracket 10 connecting the two front forks 12 to the front axle 16 which is connected through the center of the rotatable front wheel assembly 18. Such a style of cart is well known in the golf industry The disc golf cart 2 differs from conventional carts in the novel structure it incorporates for the four or five point adjustable suspension of a disc golf backpack. This suspension system holds the backpack centrally, and off of the disc golf cart frame at an angle preferred for the eased entry and exit of disc golf paraphernalia. Since it is adjustable it can accommodate various styles and sizes of backpacks and bags, allowing them to be centered to maintain the stability of the cart 2. The cart stability is of importance as the terrain traversed is often steep, and hilly with compound angle slopes. The adjustability also allows for differences in the location of the backpack access opening and for the size mass of the backpack and its contents.

The front fork bracket 10 and the upper support bracket 20 each have a pair of pivotable arms extending outward and upward therefrom. The front fork bracket 10 resides approximately perpendicular to the linear axes of both the front leg 6 and the front forks 12 so as to extend out horizontally from the bottom end of the cart 2, generally lying parallel to the front axle 16. On the right and left sides of the front fork bracket 10, extending forward are two lower arms 22 that are free to pivot. Their pivot motion has both a horizontal and vertical component (simultaneously pivoting in the vertical plane and the horizontal plane) since it resides at an acute angle with respect to the vertical, although the majority of its pivoting motion is in the horizontal plane. These lower arms 22 are linear members having a distal end and a proximal end. The lower arms 22 are pivotally attached at their distal end by a pin 24 running through the lower leaf arm 26 of the front fork bracket 10.

On the distal (outboard) ends of each of the lower arms 22 are length adjustable means for attachment 28 for the connection to the opposite lower ends of a backpack. The adjustable means for attachment 28 in the preferred embodiment are cloth straps with cinch clamps 30 thereon to adjust the length of the hooked end of the strap. However, in alternate embodiments any of a plethora of flexible, length adjustable members may be substituted as equivalents including adjustable bungee cords, shock cords, rope, cable, chains, webbing, elastic cords, hook and loop fastener straps, or toothed belts provided they have a hook means 34 at its free end and allow for a flexible, angularly adjustable connection. (Although depicted with an actual hook for the hook means 34, there are numerous equivalent structures that could be utilized such as carabeeners, devises, split rings, hinge jaw hooks, and the like.)

The adjustable means for attachment 28 are angularly affixed to the proximal ends of the lower arms 22 such that their angles with respect to the lower arms 22 may freely be established when connected to a specific connected backpack. This may be accomplished through the flexibility of the material of the adjustable means for attachment 28 or it may be accomplished by the attachment member 32 connecting the bottom end of the adjustable means for attachment 28 to the lower arms 22.

The upper support brackets 20 have upper arms 36 that are linear members with distal and proximal ends, pivotally attached at their proximal ends by a pin 24 running through the upper leaf arm 42 extending from the upper support bracket 20. Their pivot motion also has both a horizontal and vertical component (able to pivot in the horizontal plane and the vertical plane simultaneously) since it resides at an acute angle with respect to the vertical, although the majority of its pivoting motion is also in the horizontal plane. There is a cam arm 44 mounted at the top of each pin 24 that when actuated puts a force onto the top of the upper leaf arm 42 deflecting it slightly so as to cause it to frictionally interfere with the interleaved portion of the upper arms 36, thereby locking the upper arms away from each other at the proper separation. Optionally, in other embodiments, there may a two part matingly conformed toothed cylindrical members (one part affixed to each upper arm and one part affixed to the cart) that oppose each other and are brought into meshing engagement and locked as is well known in the art.

Figure 2A:
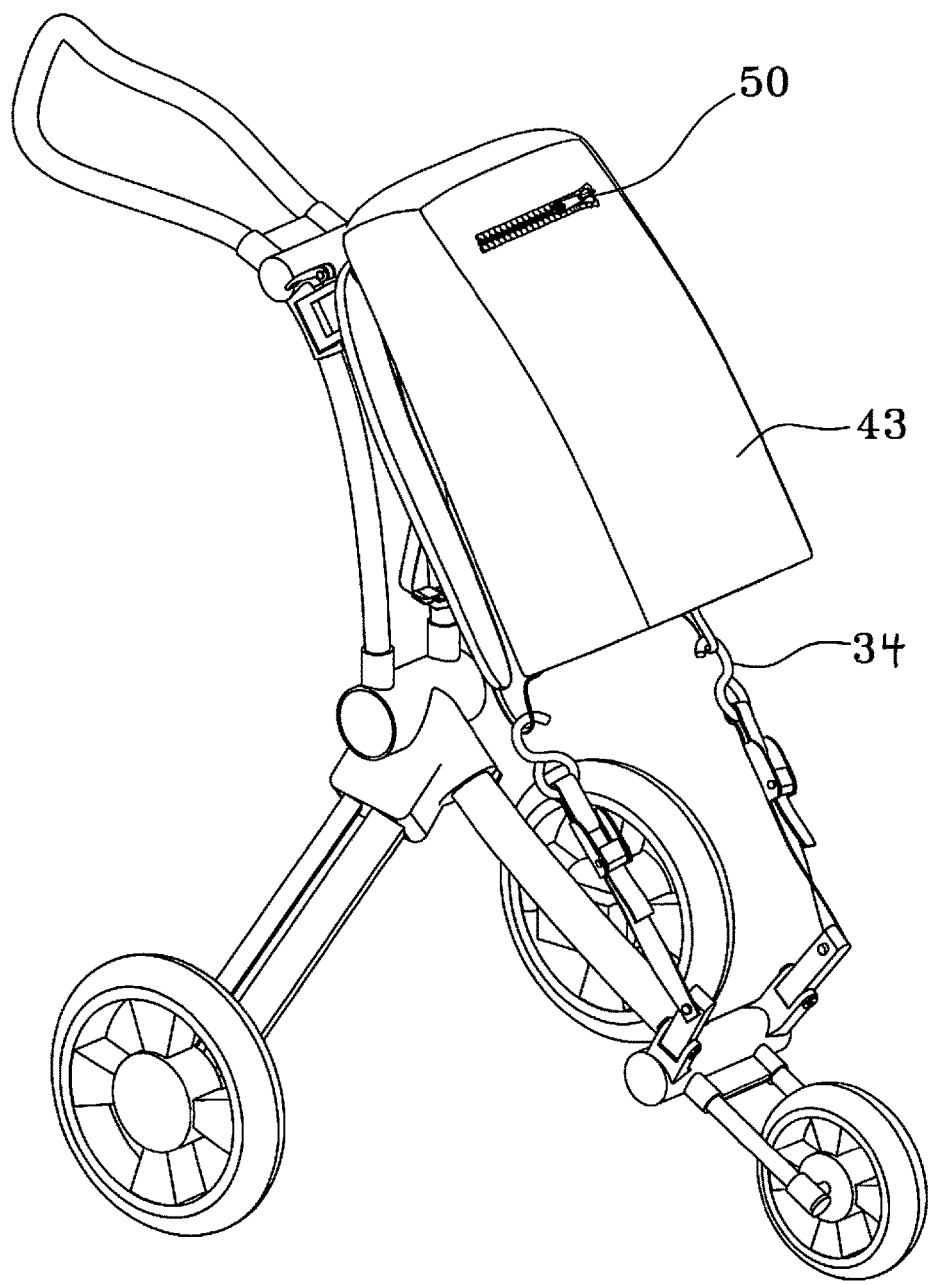
FIG. 2A is a side perspective view of the disc golf cart and a conventional backpack.
Figure 2B:
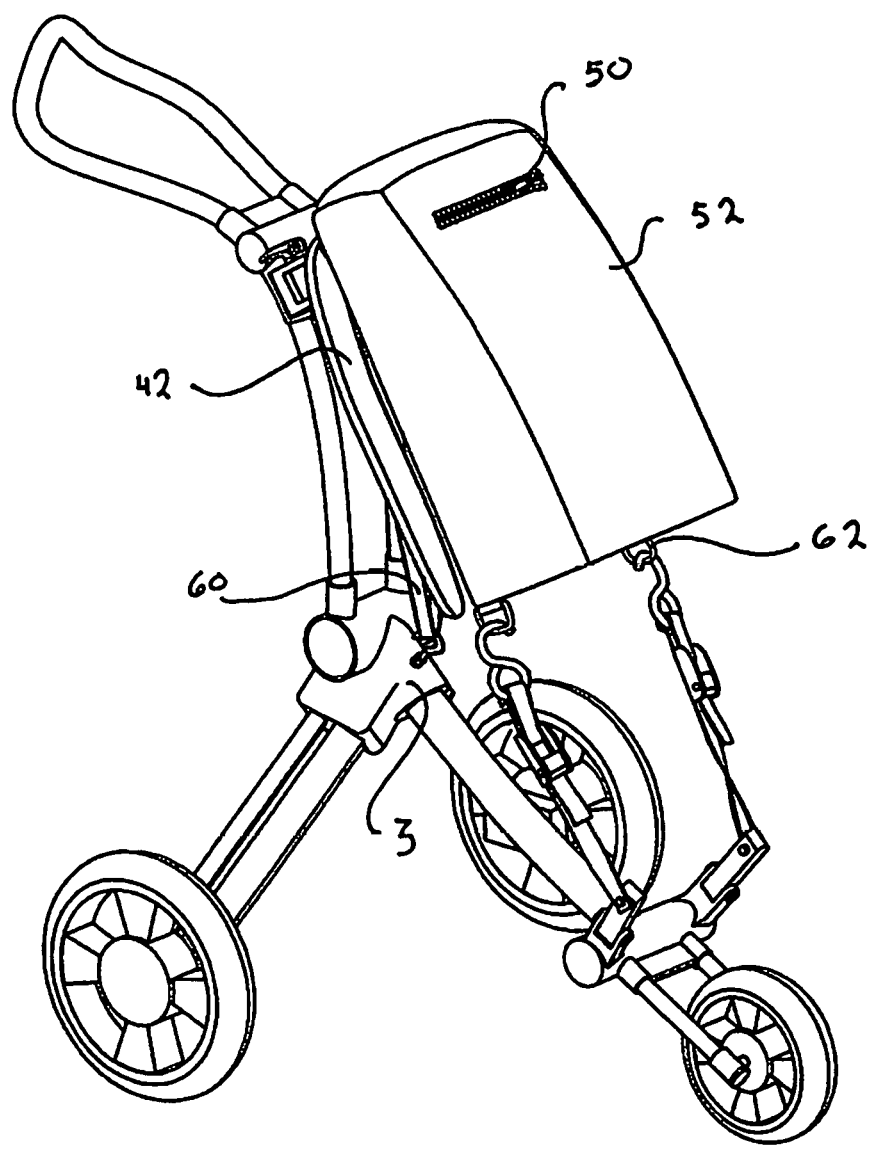
FIG. 2B is a side perspective view of the disc golf cart with optional stabilizing attachment and a D ring backpack.
Figure 3A:
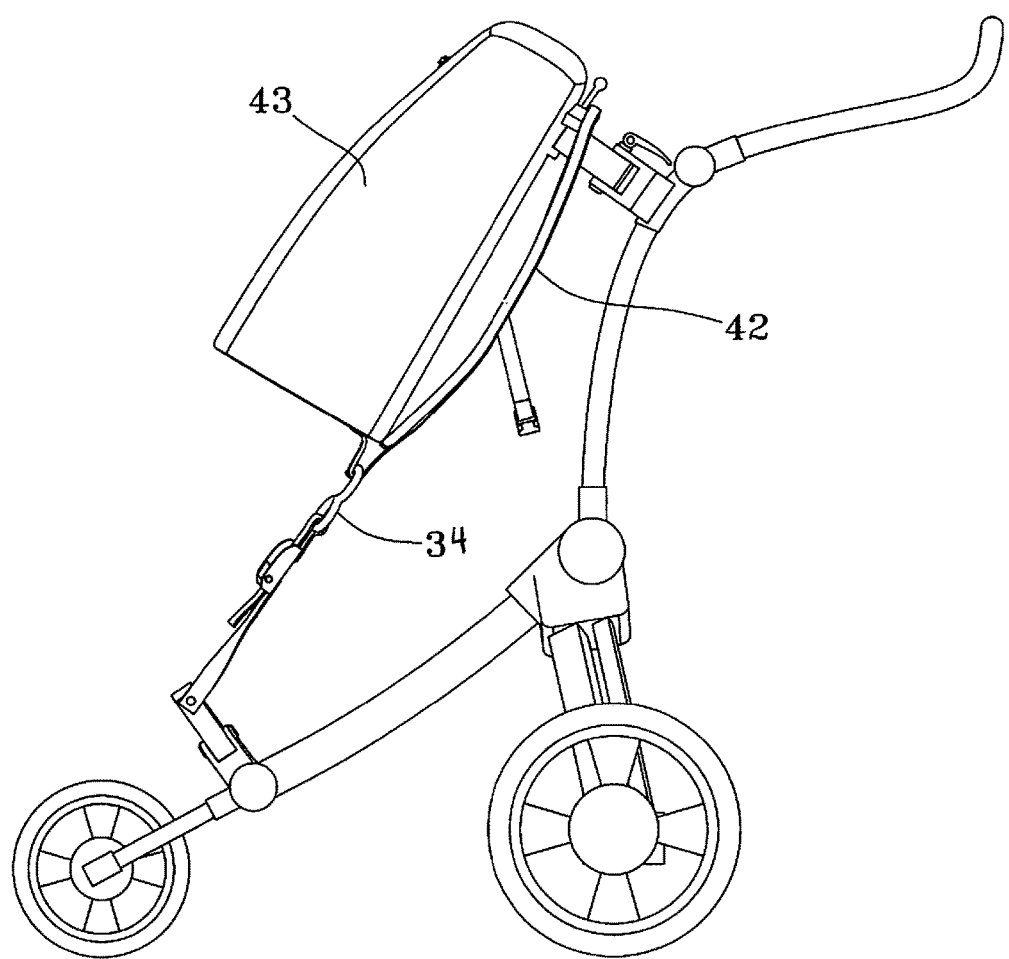
FIG. 3A is a side view of the disc golf cart and a conventional backpack.
Figure 3B:
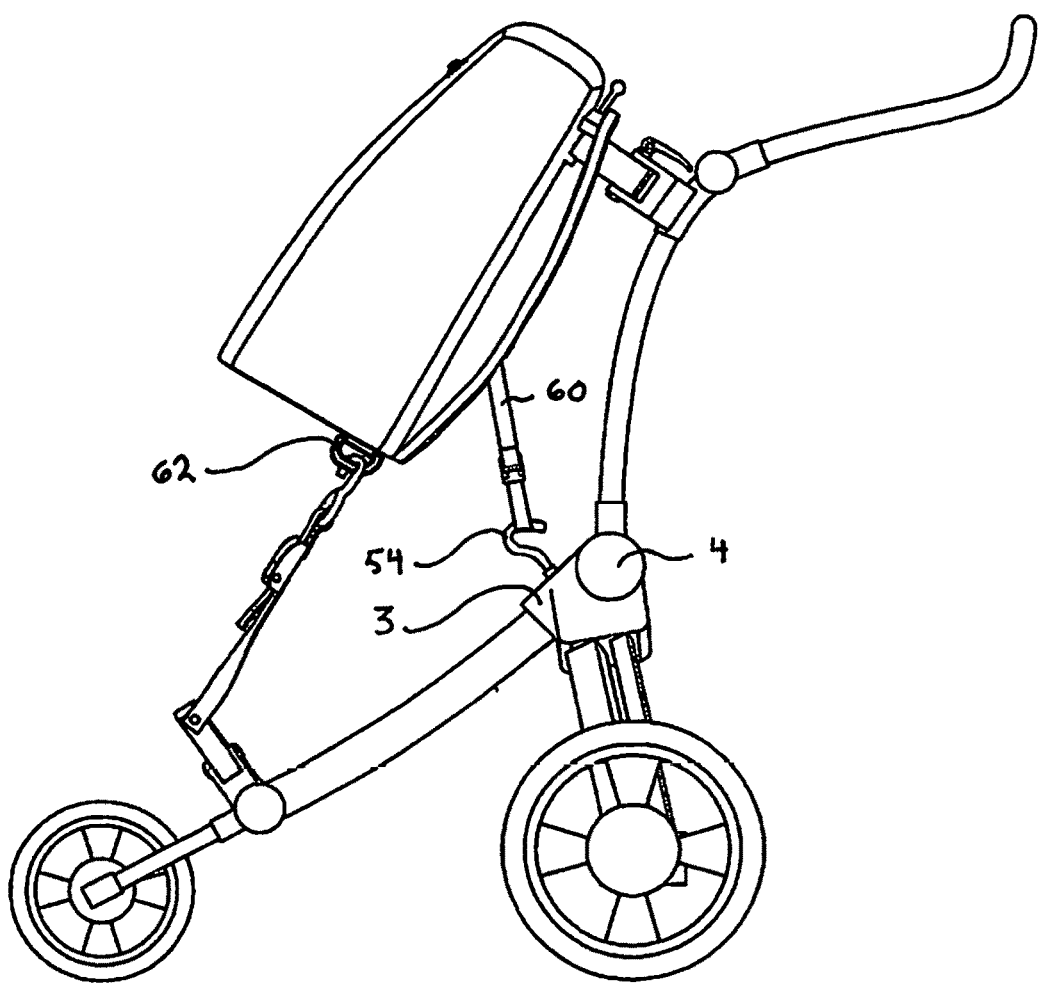
FIG. 3B is a side view of the disc golf cart with optional stabilizing attachment and a D ring backpack.
Figure 4A:
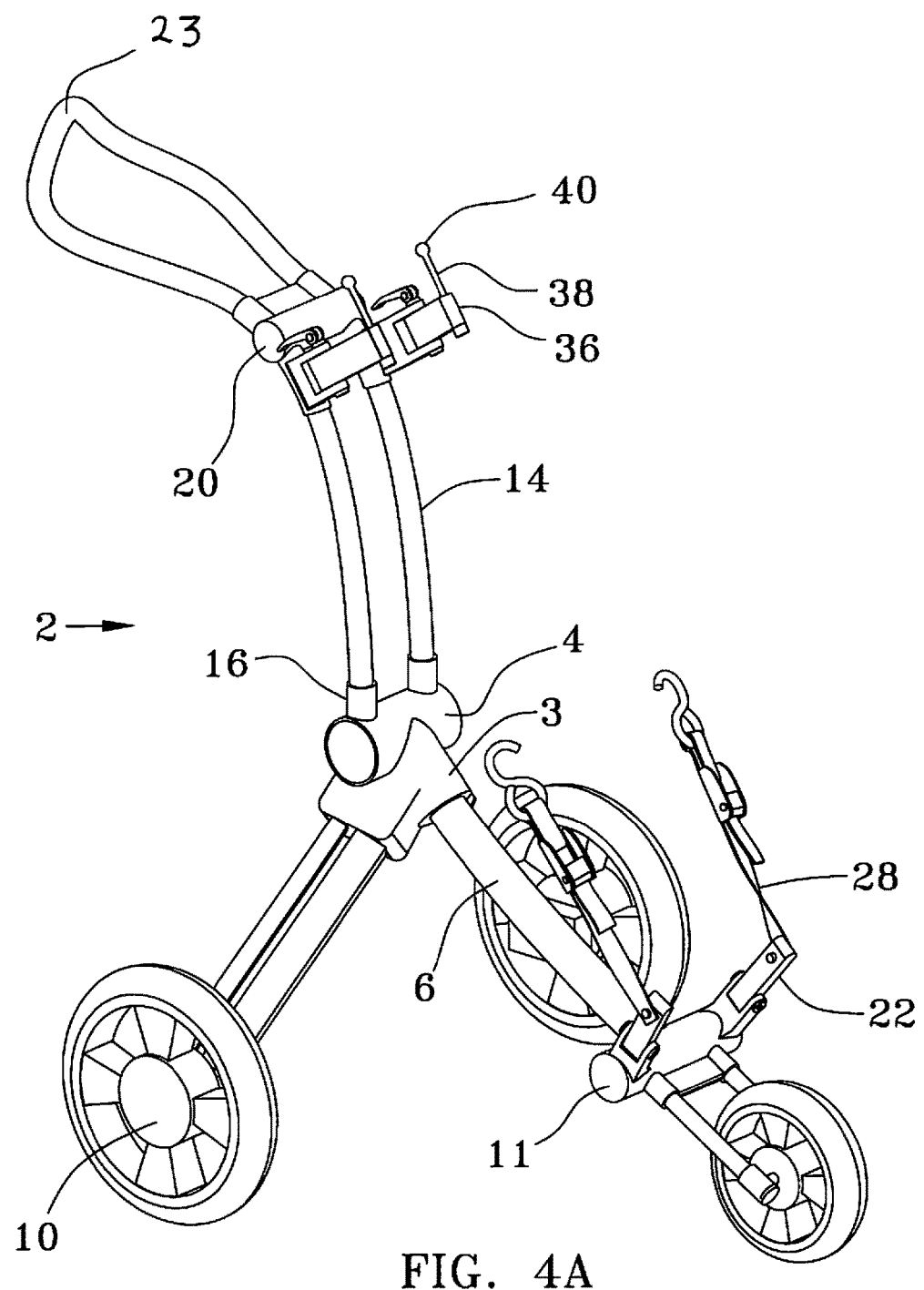
FIG. 4A is a side perspective view of the disc golf cart.
Figure 4B:
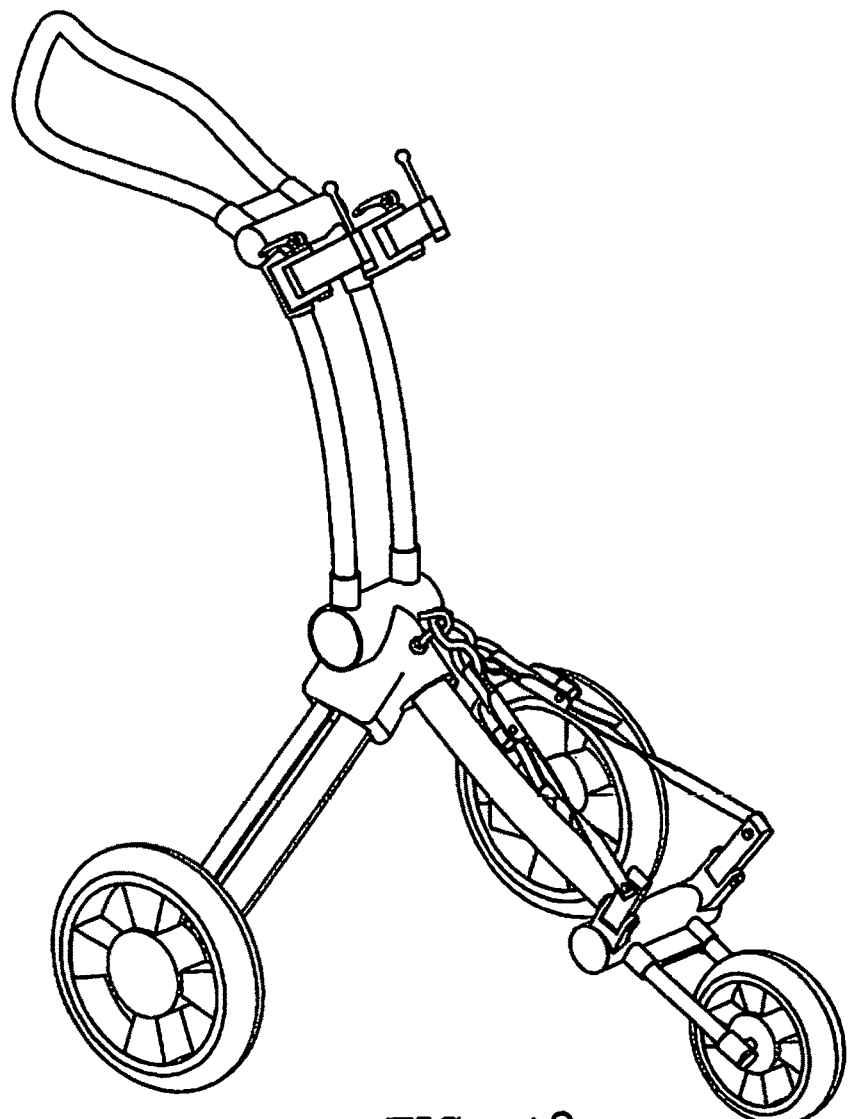
FIG. 4b is a side perspective view of the disc golf cart with optional stabilizing attachment.
Figure 5:
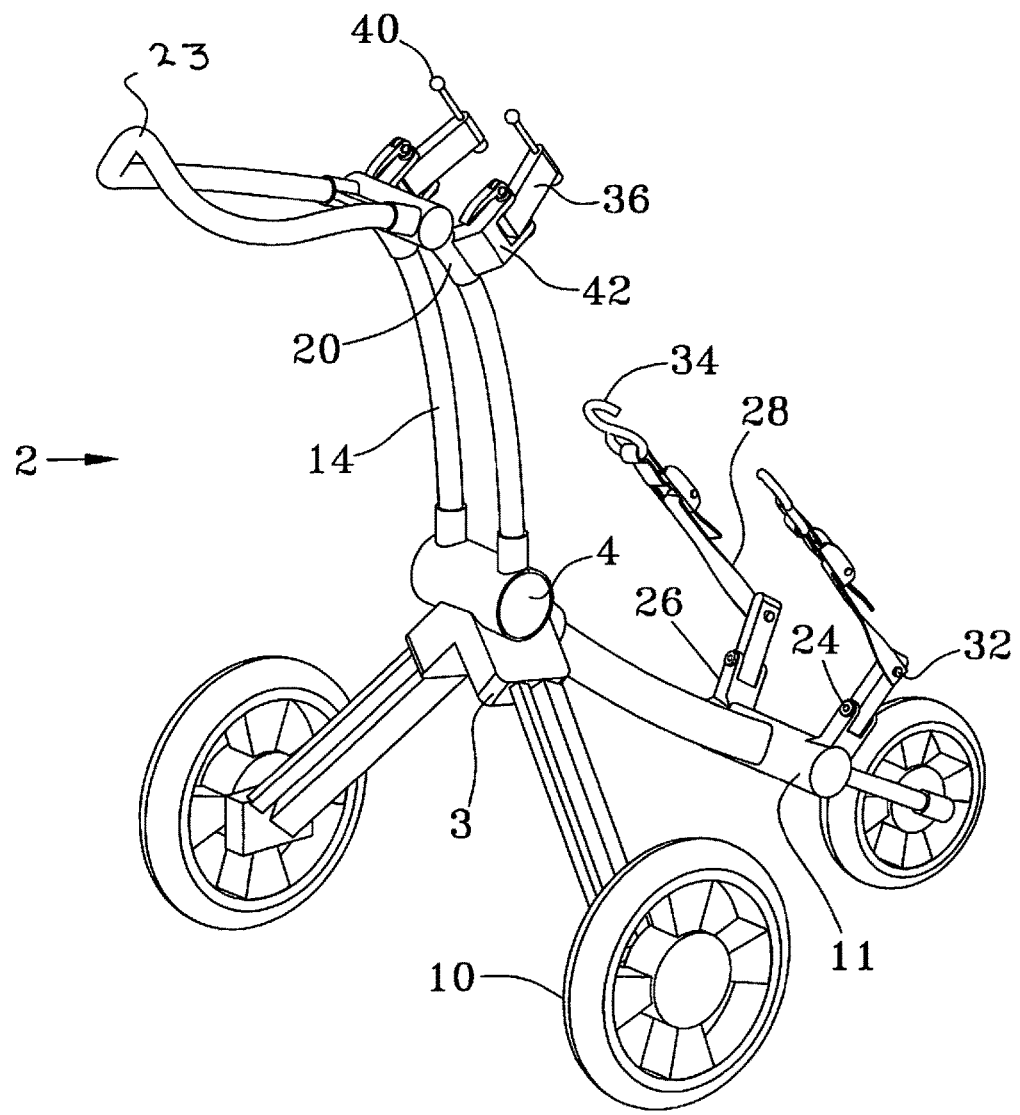
FIG. 5 is a a is a rear perspective view of the disc golf cart.
Figure 6:
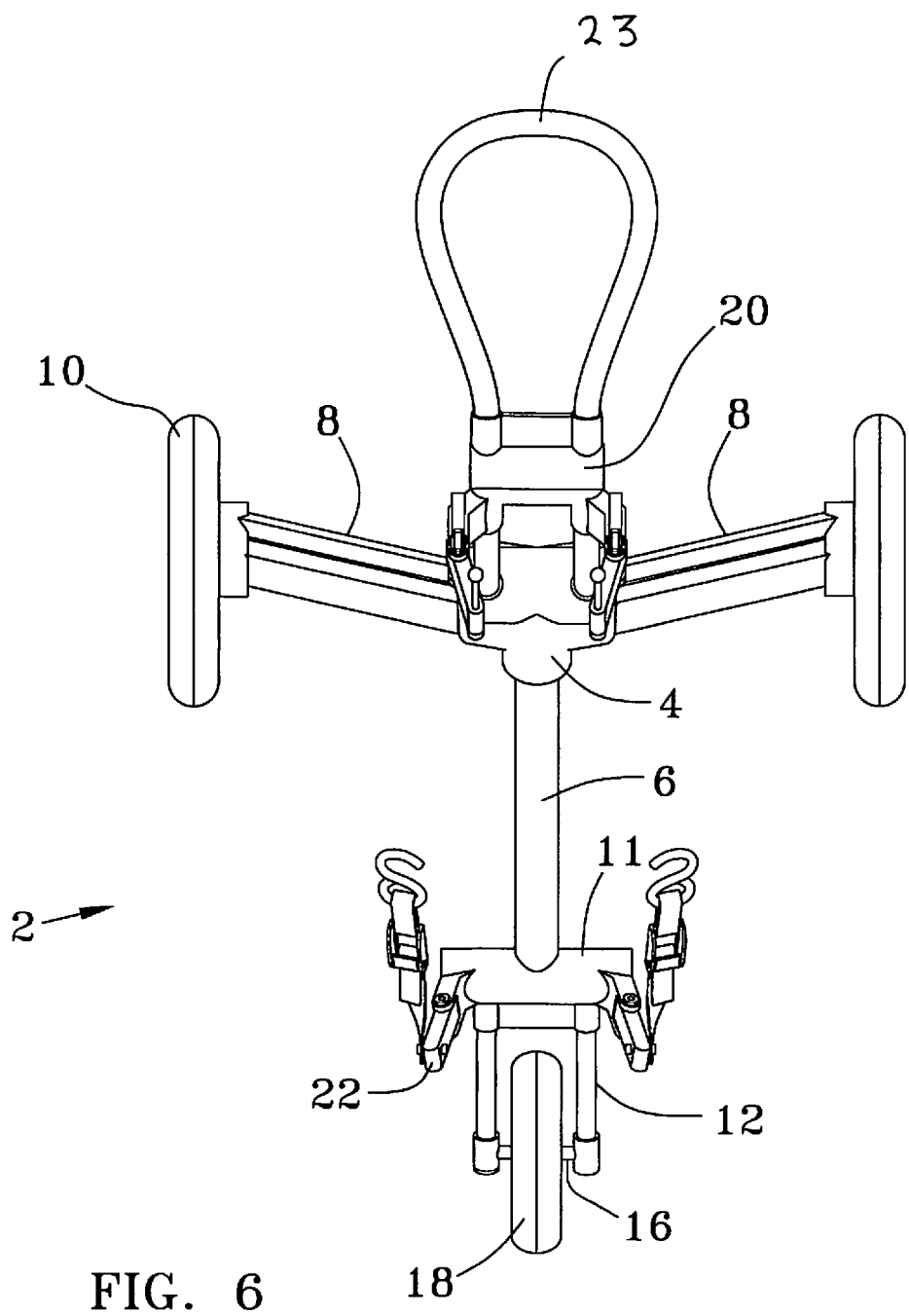
FIG. 6 is a top view of the disc gold cart.

Extending vertically from the top outboard corner (distal end) of each upper arm 36 is a horn peg 38 having a linear body with an optional bulbous protrusion 40 from its top end Looking at FIGS. 1, 2A and 3A, it can be seen that the four point suspension system is effected by hooking the top of the shoulder straps 42 or handle (which is commonly incorporated into the design of the shoulder straps) of a conventional backpack 43 over the horn pegs 34 and past the optional bulbous protrusion 40. The upper arms are spread to locate the shoulder straps 42 or handle at the maximum width spread of the shoulder straps of handle and the cam locks 44 tightened to lock the upper arms in that position. The hook means 38 are engaged onto the bottom of the shoulder straps 42 or any accessible webbing or loops on the bottom of the backpack 43 and the adjustable means for attachment 28 are shortened such that the backpack 43 is pulled taut between the upper arms 36 and the lower arm 22. While the spread on the upper arms 36 must be manually set with the cam locks 44, the angle of the adjustable means for support 28 is regulated by the amount of tension placed on them when tightened. The preferable position of the backpack 43 in the cart 2 is determined by the design of the backpack, as it is desirable to have the backpack access opening 50 as unhampered and easily accessible as possible. This however must be balanced by the stability of the card which is determined to a large degree by the location of the center of the mass in the cart and the expected terrain.

Looking at FIGS. 2B, 3B, 4B, 7B and 8B, the optional, fifth backpack suspension point can be seen as well as the preferred embodiment of the D ring disc golf backpack 52. The fifth suspension point is a central attachment member 54 extending from the front face of the central body 3, This is depicted as a hook but it is known that there are several different functionally equivalent structures such as split rings, clevis, hook and loop strips, etc. that could equally constrain the backpack chest strap and the adjustable means for attachment 28.

The central attachment member 54 is intended to be a lower connection point for any of the following: the backpack chest strap, a looped strap around the shoulder straps, secondary shoulder straps, or back webbing on the backpack. The tension between the backpack and this suspension point will be adjusted by the element looped around the central attachment member.

Figure 7A:
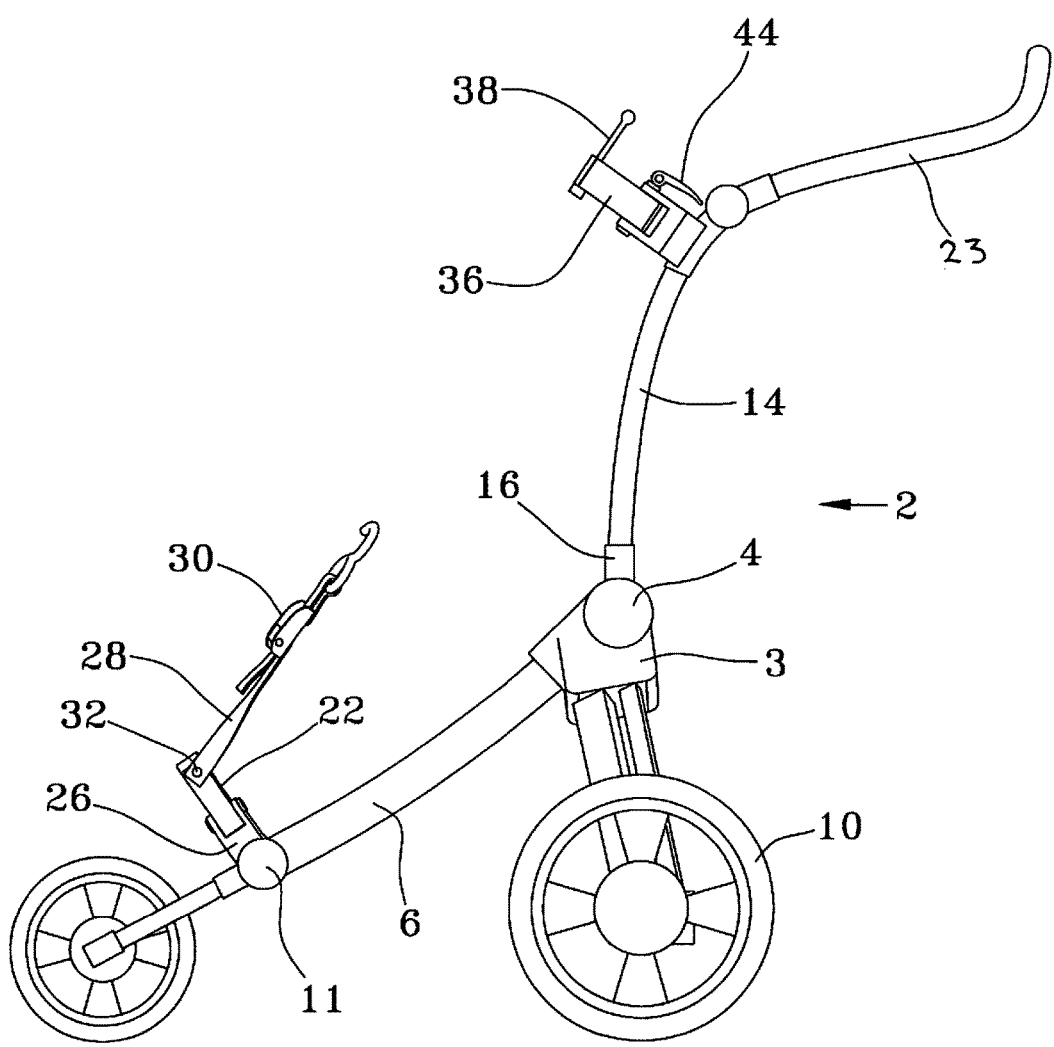
FIG. 7A is a side view of the disc golf cart.
Figure 7B:
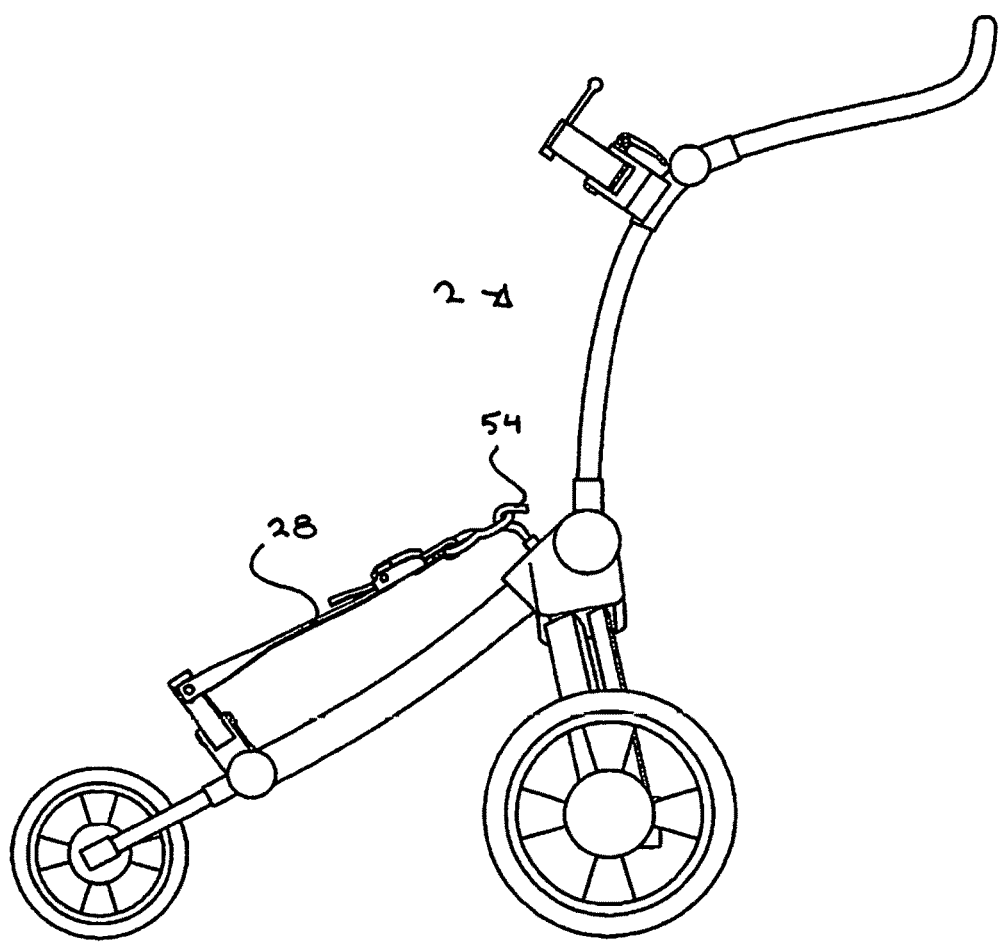
FIG. 7B is a side view of the disc golf cart with the optional stabilizing attachment.
Figure 8A:
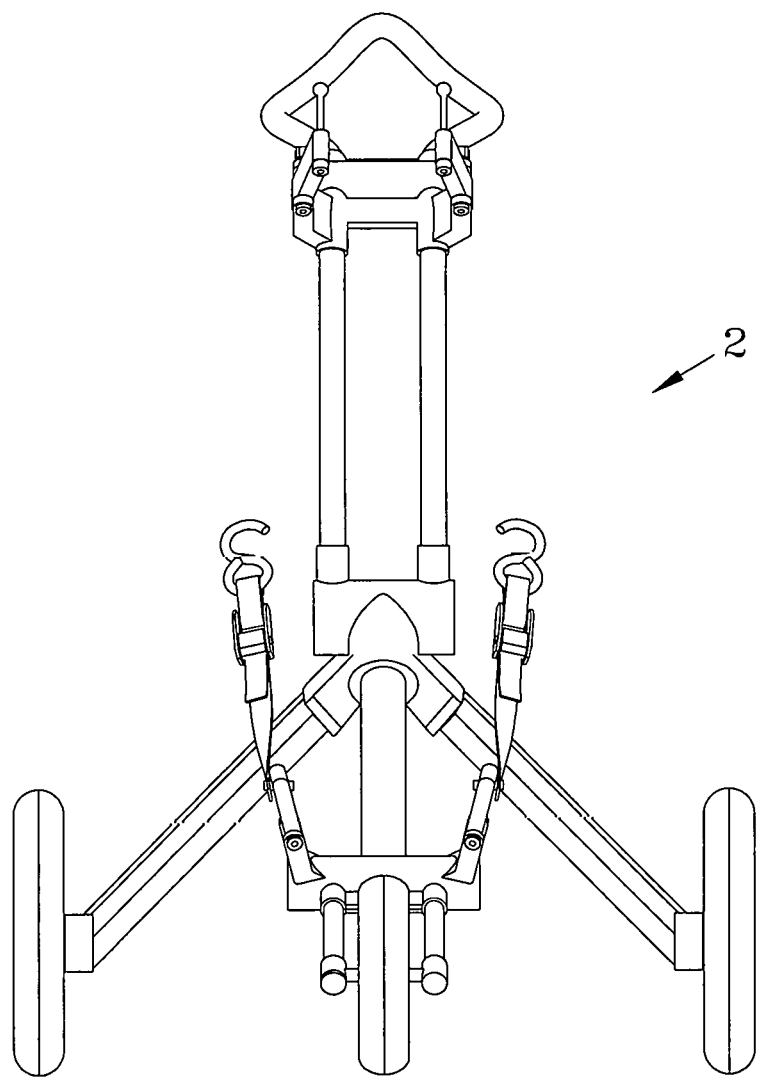
FIG. 8A is a front view of the disc golf cart.
Figure 8B:
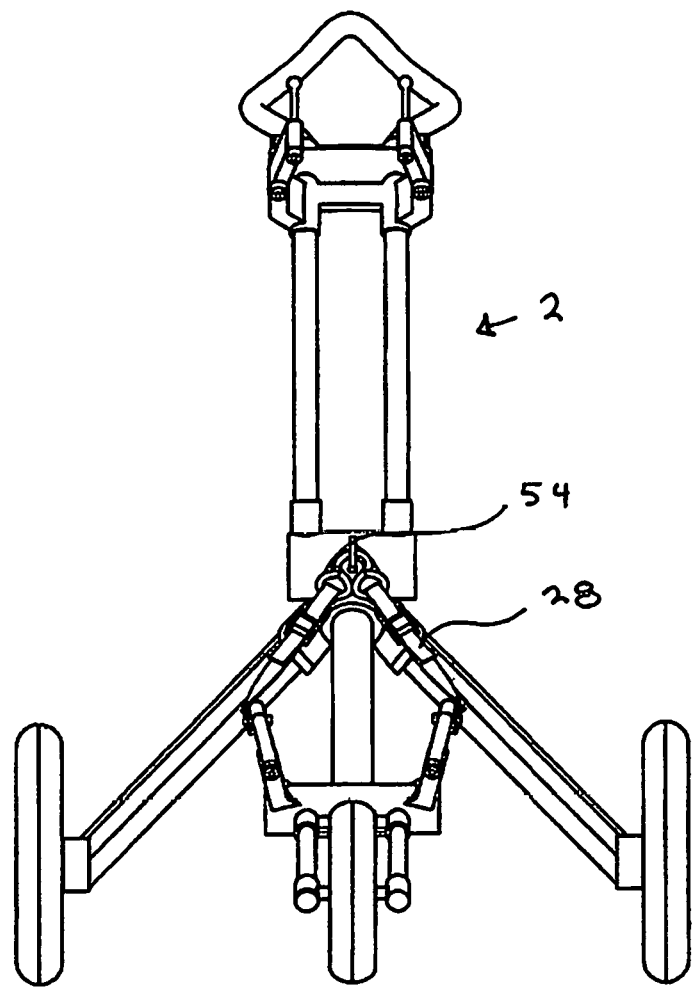
FIG. 8B is a front view of the disc golf cart with the optional stabilizing attachment.
Figure 9:
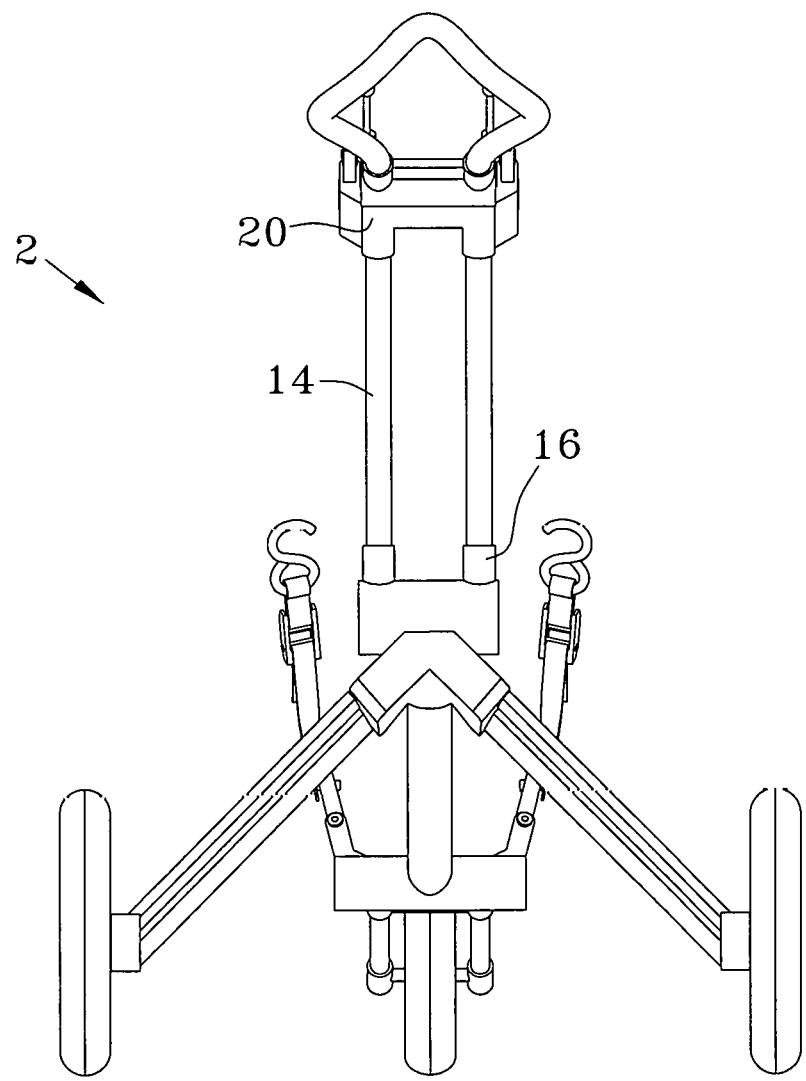
FIG. 9 is a rear view of the disc golf cart.

When not connected to a backpack the central attachment member provides a connection point for the hook means 34 on the adjustable means for attachment 28, as seen in FIGS. 7B and 8B.

The preferred embodiment of a D ring golf disc backpack 52 will have a pair of D or circular rings extending from the rear bottom corners of the backpack, a large access opening 50 positioned centrally and high up on the front face of the backpack 52, an adjustable chest strap affixed to the sides or back of the backpack 52 and a pair of shoulder straps (preferably of adjustable length).

While certain features and aspects have been described with respect to exemplary embodiments, one skilled in the art will recognize that numerous modifications are possible. The system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

Having thus described the invention, what is claimed as new and desired to be secured by Letters Patent is as follows:

1. A disc golf transport cart comprising:
   a three wheeled manual cart with a five point suspension system;
   at least two adjustable, lockable upper arms affixed at a top end of said cart, each with a peg horn extending therefrom;
   at least two pivotable lower arms affixed at lower end of said cart, each of said arms having a length and angle adjustable means for attachment; and
   a central attachment member affixed centrally to said cart;
   wherein said five point attachment system allows for a bag to be drawn taut from five different points so as to secure, and position said bag in said cart for both easy content access and maximum transit stability.

2. The disc golf transport cart of claim 1 wherein said cart is a three-wheeled cart, said cart comprising:
   a V shaped central body from which extends a front leg and two substantially similar rear legs, said legs disposed angularly with respect to each other and having rear wheel assemblies rotatably mounted thereto;
   a front fork bracket affixed to said front leg, said front fork bracket housing a pair of front forks connected to a front axle which is connected to a rotatable front wheel assembly;
   a handlebar pivot base affixed to said central body;
   at least one support tube extending from said pivot base
   a handlebar pivot base at a top of said central body, said pivot base affixed to at least one support tube which is affixed to an upper support bracket from which extends a vertically extendible handle.

3. The disc golf transport cart of claim 2 wherein said pair of lower arms, one of each said lower arms pivotally extending upward at an acute angle with respect to a horizontal plane, one of said lower arms pivotally extending from a left side and one of said lower arms pivotally extending from a right side of said front fork bracket, such that each of said lower arms is free to pivot in both a horizontal and a vertical plane simultaneously.

4. The disc golf transport cart of claim 3 wherein said lower arms are linear members having a distal end and a proximal end, said distal end pivotally attached to said front fork bracket and said proximal end affixed to a length and angle adjustable means for attachment.

5. The disc golf transport cart of claim 4 wherein said length and angle adjustable means for attachment as selected from the group consisting of bungee cords, shock cords, rope, cable, chains, webbing, elastic cords, and hook and loop fastener straps provided they have a hook means at their free end and allow for a flexible, angularly adjustable connection.

6. The disc golf cart of claim 5 wherein said upper arms pivotally extend upward at an acute angle with respect to said vertical plane, one of said upper arms pivotally extending from a left side and one of said upper arms pivotally extending from a right side of said upper support bracket, such that each of said upper arms is free to pivot in both a horizontal and a vertical plane simultaneously.

7. The disc golf cart of claim 6 wherein said peg horns have a lower end and an upper end, said lower ends affixed to said upper arms and said upper ends having a bulbous protrusion thereon.

8. The disc golf transport cart of claim 4 wherein said upper support bracket is connected by a pair of lockable cam arms to said at least two lockable upper arms, said at least two lockable upper arms being linear members with a distal end and a proximal end, said distal ends having a peg horn extending vertically therefrom.

9. The disc golf cart of claim 8 wherein said central attachment member is affixed to said cart at said V shaped central body.

10. The disc golf cart of claim 8 wherein said central attachment member is selected for the group consisting of hooks, split rings, devises, and hook and loop strips.

\* \* \* \* \*